United States Patent [19]

Kumagai

[11] Patent Number: 5,064,330
[45] Date of Patent: Nov. 12, 1991

[54] BELT-SHAPED MEMBER TAKING-OUT AND TRANSFER APPARATUS

[75] Inventor: Yuzo Kumagai, Niiza, Japan

[73] Assignee: Bridgestone Corporation, Tokyo, Japan

[21] Appl. No.: 557,350

[22] Filed: Jul. 25, 1990

[30] Foreign Application Priority Data

Jul. 25, 1989 [JP] Japan .................................. 1-192050

[51] Int. Cl.$^5$ ............................................. B65G 67/02
[52] U.S. Cl. ..................... 414/331; 414/403; 414/417; 198/463.3; 198/782
[58] Field of Search ............... 414/222, 277, 278, 282, 414/285, 331, 403, 417, 418, 659, 660, 672, 785; 156/111, 344, 396, 406, 406.2, 345; 198/463.3, 782

[56] References Cited

U.S. PATENT DOCUMENTS

| | | | |
|---|---|---|---|
| 2,832,396 | 4/1958 | Harris | 414/222 X |
| 3,055,518 | 9/1962 | Pearne et al. | 414/331 |
| 3,696,949 | 10/1972 | Leblond et al. | 414/331 |
| 3,700,121 | 10/1972 | McManus | 414/331 |
| 4,582,464 | 4/1986 | Bossetti | 414/331 |

FOREIGN PATENT DOCUMENTS 45-25375  8/1970  Japan .

*Primary Examiner*—Robert J. Spar
*Assistant Examiner*—J. Eller
*Attorney, Agent, or Firm*—Sughrue, Mion, Zinn, Macpeak & Seas

[57] ABSTRACT

A belt-shaped member taking-out and transfer apparatus serves to take belt-shaped members one by one from a container having a plurality of shelves vertically stacked, and transferring them to a server of a tire building machine. The apparatus includes a lifter supporting thereon the container and intermittently raising and lowering the container, and a roller conveyor having a carriage arranged on one side of the container. The carriage is movable in width directions of the belt-shaped members. A plurality of elongated rollers are rotatably supported with their bottom ends remote from the container by the carriage. The elongated rollers extend in the width directions of the belt-shaped members in the container and spaced from each other in longitudinal directions of the belt-shaped members.

7 Claims, 6 Drawing Sheets

FIG_1

FIG_3

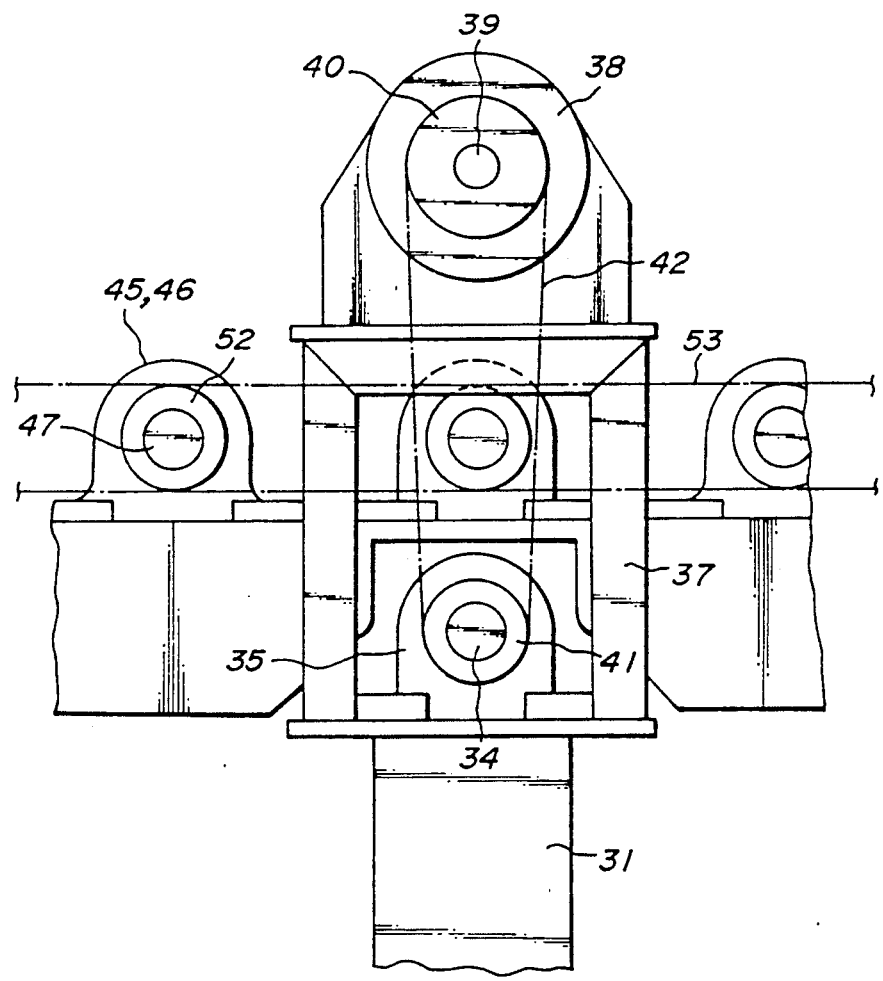
FIG_6

BELT-SHAPED MEMBER TAKING-OUT AND TRANSFER APPARATUS

BACKGROUND OF THE INVENTION

This invention relates to a belt shaped member taking-out and transfer apparatus for taking out belt-shaped members one by one from a container and transferring them to a server of a building machine.

In general, belt-shaped members are successively wound about a drum of a building machine to form green tires in the tire industry.

In the past, such belt-shaped members after molding were once arranged on a so-called book trolley, that is to say, a trolley having a number of shelves vertically stacked and supported at ends to be rockable between horizontal and inclined positions. The book trolley was then transferred to the proximity of a tire building machine and a worker successively took out the belt-shaped members from upper shelves to feed them onto a server of the building machine. Thereafter, the empty shelves were raised from the horizontal position to inclined positions.

However, as the belt-shaped members are heavy and long, such manual taking-out and transferring operations take considerable time for supplying the materials with low efficiency and require a worker to do heavy labor for the operations.

SUMMARY OF THE INVENTION

It is an object of the invention to provide an improved belt-shaped member taking-out and transfer apparatus which eliminates all the disadvantages of the prior art and is simple in construction, lightweight, inexpensive and automatically operates with high efficiency.

In order to accomplish the object, in a belt-shaped member taking-out and transfer apparatus for taking out belt-shaped members one by one from a container having a plurality of shelves vertically stacked, on each of the shelves the belt-shaped members being arranged in parallel with each other, and transferring them to a server of a building machine, the apparatus according to the invention comprises a lifter supporting thereon the container and intermittently raising and lowering the container, and a roller conveyor including a carriage arranged on one side of the container and movable in width directions of the belt-shaped members and a plurality of elongated rollers rotatably supported with their bottom ends remote from the container by the carriage and extending in the width directions of the belt-shaped members and spaced from each other in longitudinal directions of the belt-shaped members.

It is now assumed that the container loaded with the belt-shaped members is arranged on the lifter. When the lifter is at a predetermined position or, for example, the upper limit position, the lifter need not be moved. If the lifter is at a position other than the predetermined position, the lifter must be moved to the required position.

The roller conveyor is then moved toward the container in the width direction of the belt-shaped member so that the elongated rollers are inserted immediately below the belt-shaped member nearest to the roller conveyor on a predetermined shelf or the lowermost shelf. The lifter is then actuated to lower the container through a distance equal to the distance between the vertically adjacent shelves. During this lowering movement of the container, the belt-shaped member above described is transferred onto the elongated rollers and taken out from the container.

In this case, if the belt-shaped member taken out from the container is aligned with a server of a building machine, the belt-shaped member need not be shifted. However, when the belt-shaped member is not aligned with the server, the roller conveyor is moved together with the belt-shaped member in the width direction of the member to bring the belt-shaped member into alignment with the server. Thereafter, the elongated rollers are rotated to move the belt-shaped member in its longitudinal direction onto the server. In the case that the roller conveyor has been moved in the width direction, the roller conveyor is moved again toward the container so that the elongated rollers are inserted immediately below a belt-shaped member positioned directly above the belt-shaped member taken out from the container.

Thereafter, the lifter is actuated to lower the container through a distance equal to the distance between the vertically adjacent belt-shaped members to take out a belt-shaped member from the container. If there is a shelf having no belt-shaped member, the container is lowered skipping over such a shelf so that the lowering distance of the container is a positive integer times the distance between the vertically adjacent belt-shaped members. The belt-shaped member on the elongated rollers is then transferred onto the server in the same manner as above described. Such an operation is repeated so that the belt-shaped members nearest to the roller conveyor are taken out from the container one by one and transferred to the server. After termination of the step of taking-out of the belt-shaped members nearest to the roller conveyor from the container and transferring them to the server in this manner, belt-shaped members secondly near to the roller conveyor are successively taken out from the container and transferred to the server in the same manner as above described. All the belt-shaped members loaded in the container are taken out from the container one by one and transferred onto the server. The empty container is then removed from the lifter and transferred to a station.

In the above explanation, after the belt-shaped member nearest to the roller conveyor in each of the shelves vertically stacked has been taken out from the container, the second belt-shaped member in each of the shelves is taken out from the container. However, after all the belt-shaped members have been taken out from one of the shelves, all the belt-shaped members may be taken out from the next shelf. In this manner, the taking out and transferring operation of the belt-shaped members can be carried out only by the lifter and the roller conveyor according to the invention. Therefore, the apparatus according to the invention is simple in construction, lightweight and inexpensive to manufacture. Moreover, such operations can be mechanically effected without relying upon labor of an operator so that operating efficiency is improved and the operations can be automated.

The invention will be more fully understood by referring to the following detailed specification and claims taken in connection with the appended drawings.

BRIEF DESCRIPTION OF THE DRAWINGS

FIG. 6 is a view of the apparatus viewed in a direction shown by arrows VI in FIG. 2.

EXPLANATION OF THE PREFERRED EMBODIMENTS

Figure 1:
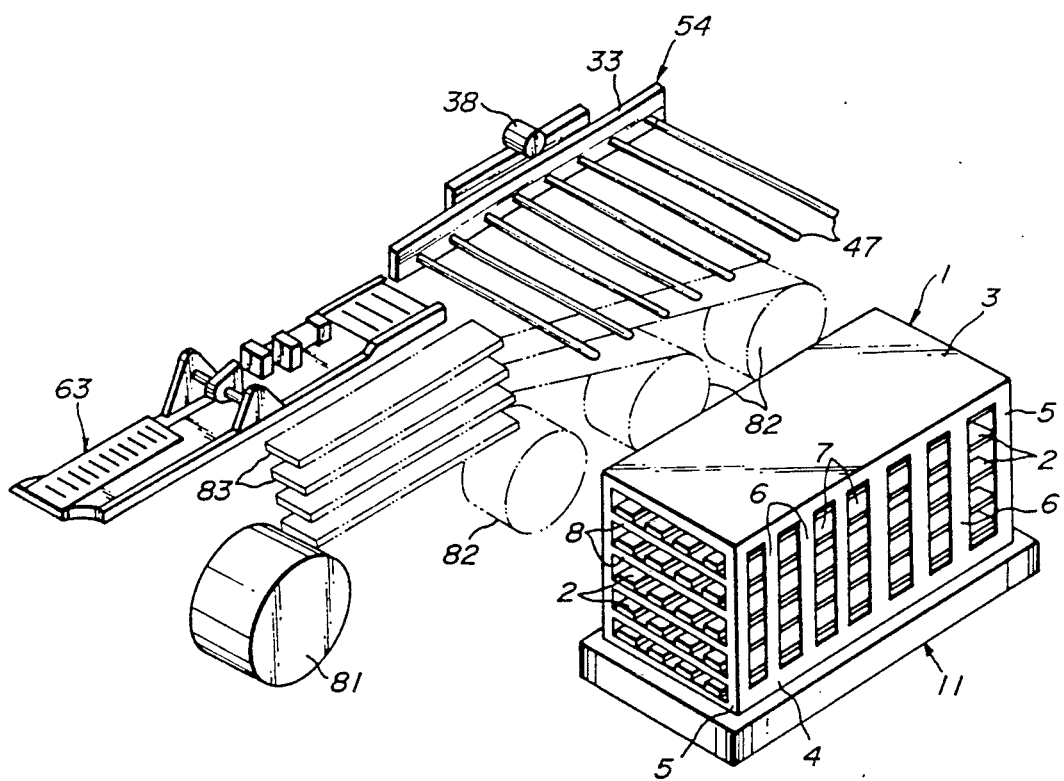
FIG. 1 is a schematic perspective view illustrating one embodiment of the invention as a whole.
Figure 2:
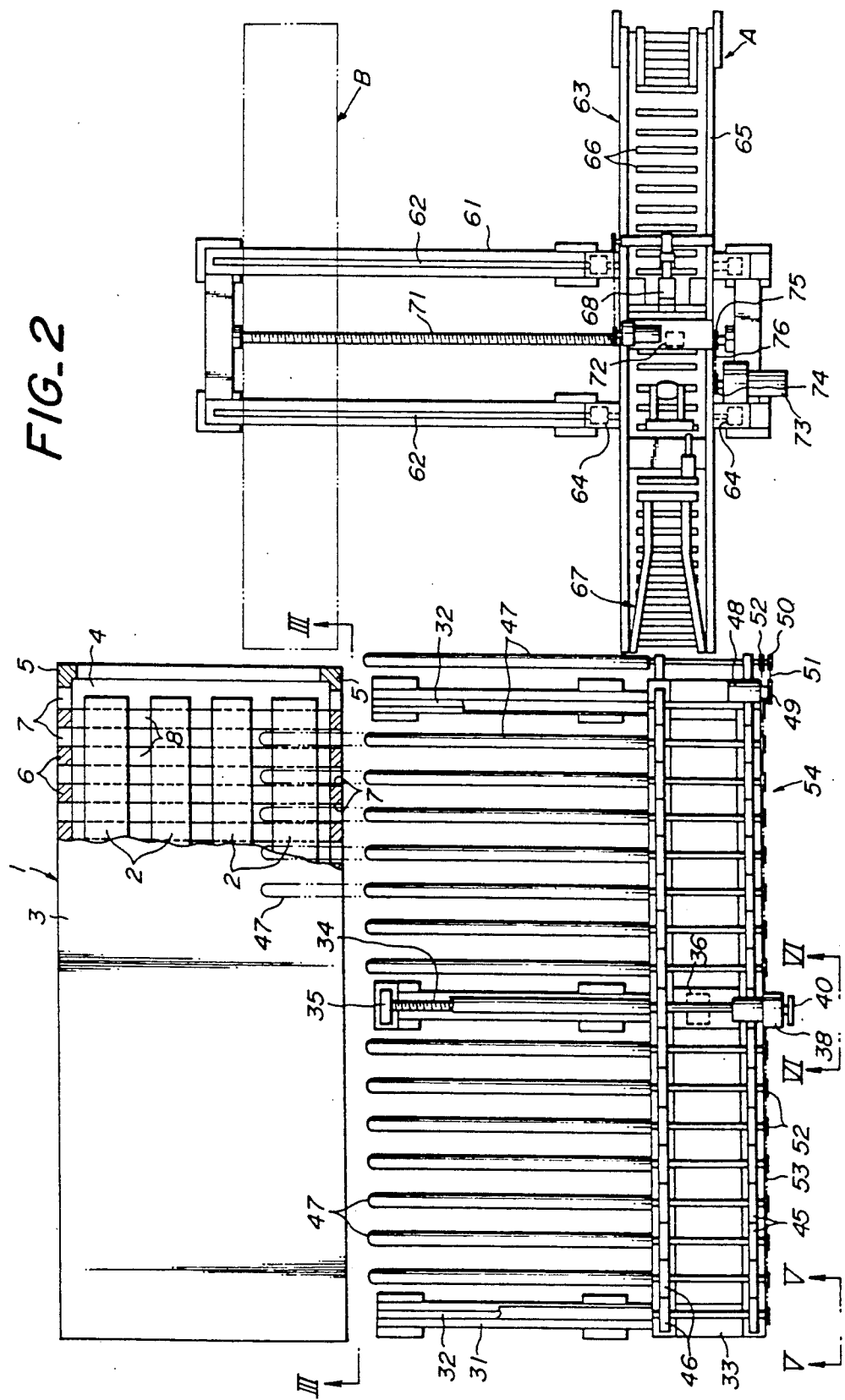
FIG. 2 is a plan view of the apparatus shown in FIG. 1.
Figure 3:
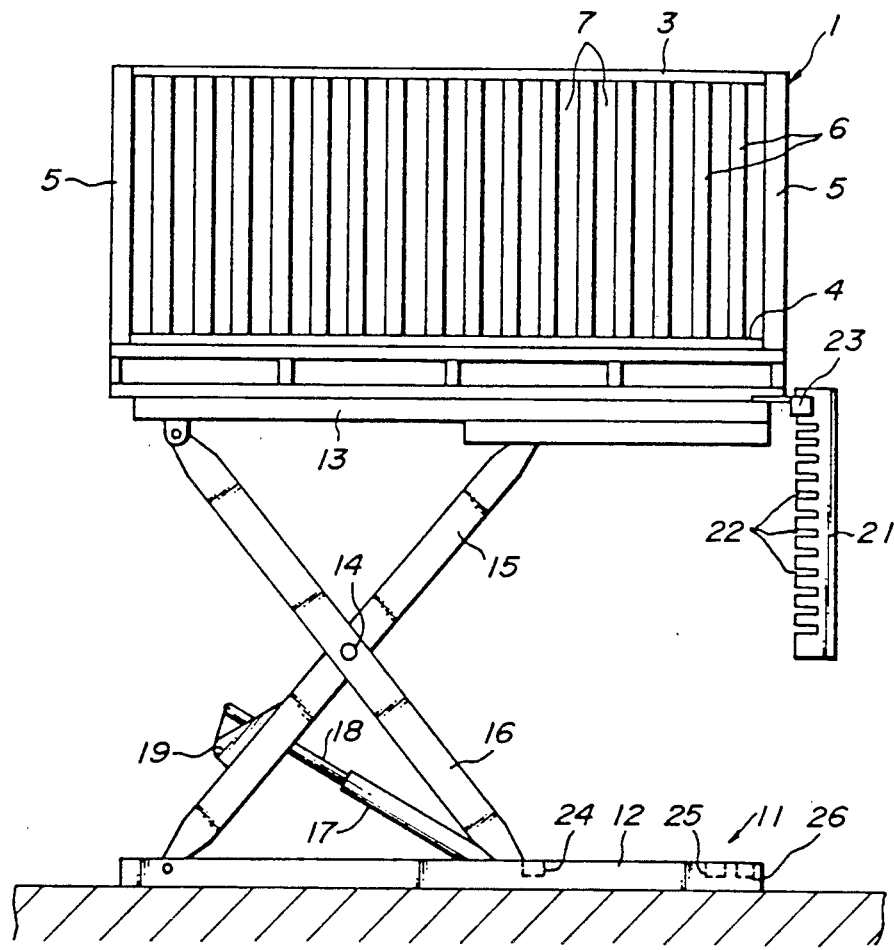
FIG. 3 is a view of the container and lifter of the apparatus viewed in a direction shown by arrows III in FIG. 2.

Referring to FIGS. 1, 2 and 3, a container 1 for arranging thereon belt-shaped members 2 cut in predetermined lengths, for example tread rubbers, comprises a rectangular top plate 3, a rectangular bottom plate 4 and vertical columns 5 connecting four corners of the top and bottom plates 3 and 4. Sides of the top and bottom plates 3 and 4 are connected by a plurality of support plates 6 in parallel with the vertical columns 5. The support plates 6 are arranged spaced equal distances from each other in longitudinal directions of the top and bottom plates 3 and 4. As a result, opposite side surfaces of the container 1 have plural vertical slits 7 spaced equal distances from each other in longitudinal directions of the container 1.

Opposite support plates 6 are connected by plural shelf plates 8 horizontally extending in transverse directions of the top plate 3 and spaced equal distances from each other in vertical directions. The plural (four in this embodiment) belt-shaped members 2 are arranged on each of the shelves 8 and extend in longitudinal directions of the container 1. In other words, the belt-shaped members 2 in the container 1 are arranged side by side in width directions of the belt-shaped members 2 and are arranged on plural shelves vertical stacked.

A lifter 11 comprises a rectangular stationary base 12, a lifting base 13 of substantially the same shape as the stationary base 12 and supporting thereon the container 1, and rocking links 15 and 16. The rocking links 15 are pivotally connected with their lower ends to the stationary base 12 and movably connected with their upper ends to the lifting base 13. On the other hand, the rocking links 16 are pivotally connected with their upper ends to the lifting base 13 and movably connected with their lower ends to the stationary base 12. Center portions of the rocking links 15 and 16 are pivotally connected to each other by pins 14. When the rocking links 15 and 16 are rocked, the ends movably connected to the stationary base 12 and the lifting base 13 are moved in longitudinal directions of these bases 12 and 13. A cylinder 17 is provided whose head end is connected to the stationary base 12 and piston rod end is connected through a bracket 19 to a mid portion of the rocking link 15. As a result, when the cylinder 17 is actuated, the rocking links 15 and 16 are rocked to raise the container 1 on the lifting base 13.

In front of the lifting base 13, there is provided a slit bar 21 extending in a vertical direction and formed with slits 22 whose number is substantially equal to the number of the shelves 8 vertically stacked. These slits 22 are spaced apart from each other distances substantially equal to the distances between the shelves in the vertical directions.

A detecting sensor 23, for example, photoelectric sensor is mounted at the front end of the lifting base 13 and detects one slit 22, when the cylinder 17 is being operated, to feed a detecting signal to the cylinder 17 to stop the operation of the cylinder 17 and hence the vertical movement of the lifting base 13. As a result, the container 1 arranged on the lifter 11 can be lowered intermittently through distances equal to the distance between the vertically adjacent shelves 8.

Detecting sensors 24, 25 and 26, for example, limit switches are mounted on the stationary base 12. The detecting sensor 24 detects the other end or movable end of the rocking link 16 when the lifting base 13 has been raised to the upper limit position. The detecting sensor 25 detects the other end or movable end of the rocking link 16 when the lifting base 13 has been lowered to the taking-out operation termination position. The detecting sensor 26 detects the other end or movable end of the rocking link 16 when the lifting base 13 has been lowered to the lower limit position. Detecting signals from these sensors 24, 25 and 26 are fed to the cylinder 17 to stop it.

Referring to FIGS. 1, 2, 4, 5 and 6, on a side of the lifter 11 is arranged a frame 31 on which are provided a pair of rails 32 extending perpendicularly to the belt-shaped members 2. A carriage 33 having slide bearings 30 slidably engaging the rails 32 is movable in width directions of the belt-shaped members 2 along the rails 32. A screw-shaft 34 is rotatably supported by bearings 35 on the frame 31 between the rails 32. The screw shaft 34 extends in parallel with the rails 32 and is threadedly engaged in a screw-block 36 mounted on the carriage 33.

To one end of the frame 31 is fixed a bracket 37 on which is mounted a motor 38. A chain 42 extends about a sprocket 40 fixed to an output shaft 39 of the motor 38 and a sprocket 41 fixed to one end of the screw-shaft 34. As a result, when the motor 38 is energized to rotate the screw-shaft 34, the carriage 33 is moved in the width directions of the belt-shaped members 2 toward and away from the container 1.

On the carriage 33 are mounted a plurality of bearings 45 and 46 in two rows in opposition to each other. A plurality (the number substantially equal to that of the slits 7) of elongated rollers 47 are rotatably supported by the bearings 45 and 46 with one ends remote from the container 1 and extend in parallel with the rails 32 or in the width directions of the belt-shaped members 2. The elongated rollers 47 are arranged spaced from each other in longitudinal directions of the belt-shaped members 2 with equal intervals which are substantially equal to distances between the support plates 6. As a result, when the carriage 33 is moved toward the container 1, the elongated rollers 47 can be inserted through the slits 7 into the container 1. The elongated rollers 47 have lengths from portions supported by the bearings 46 to the other or free ends, which are substantially equal to the length of the short sides of the container 1.

On a front end of the carriage 33 is mounted a motor 48 whose output shaft has a sprocket 49 fixed to its end. A chain 51 extends about the sprocket 49 and a sprocket 50 fixed to the support end of the elongated roller 47 arranged forwardmost end of the roller conveyor 54. Sprockets 52 are fixed to the supported ends of the respective rollers 52. A chain 53 extends about all the sprockets 52. As a result, when the motor 48 is energized, all the rollers 47 are rotated in the same direction at the same speed. The carriage 33, the screw-shaft 34, the motor 38, the bearings 45 and 46, the rollers 47 and the motor 48 form as a whole a roller conveyor 54 arranged on one side of the container 1.

Figure 4:
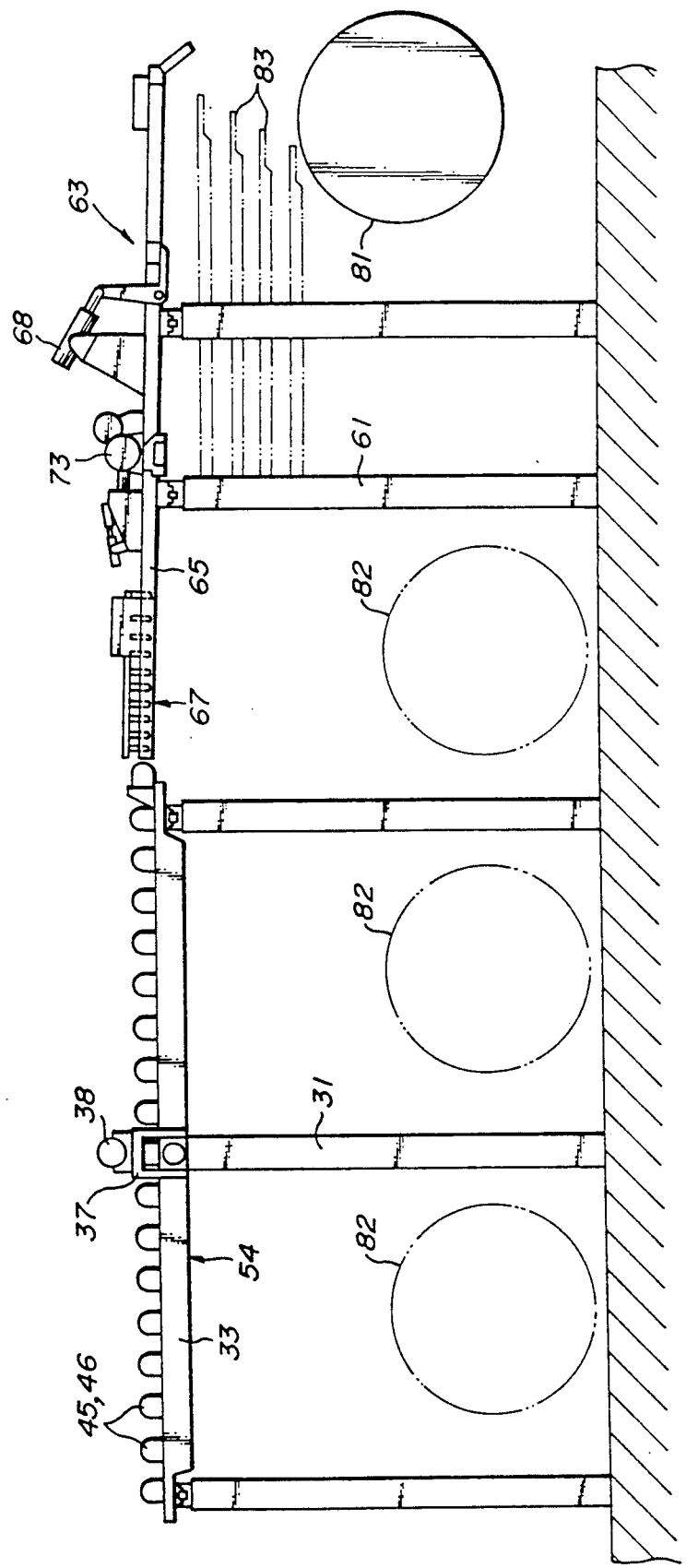
FIG. 4 is a front elevation of the apparatus shown in FIG. 1.
Figure 5:
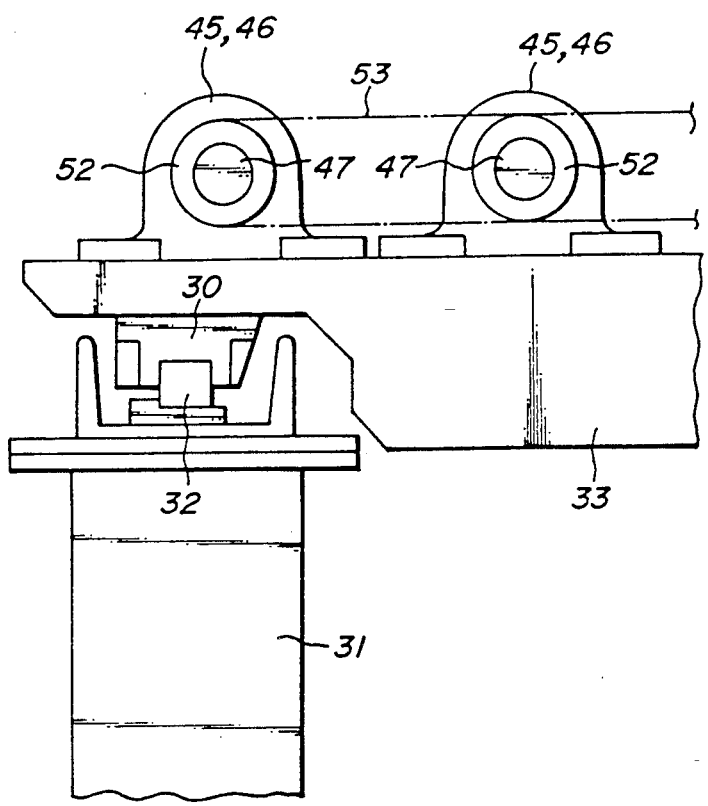
FIG. 5 is a partial view of the apparatus viewed in a direction shown by arrows V in FIG. 2.

Referring to FIGS. 1, 2 and 4, in front of the lifter 11 and the frame 31, there is provided a frame 61 on which a pair of rails 62 are arranged in parallel, with the rails 32. A server 63 comprises a movable frame 65 having slide bearings 64 slidably engaging the rails 62, a number of rotating rollers 66 rotatably supported by the movable frame 65 and extending in parallel with the rollers 47, and a centering mechanism 67 for centering the belt-shaped members 2 by pushing side edges of the members 2 being transferred on the rotating rollers 66 inwardly in width directions of the members 2. A front end of the movable frame 65 is rockable downwardly by means of a cylinder 68.

A screw-shaft 71 is rotatably supported by the frame 61 between the rails 62. The screw-shaft 71 extends in parallel with the rails 62 and threadedly engaged in a screw-block 72. A motor 73 is mounted onto one end of the frame 61. A chain 76 extends about a sprocket 74 fixed to an output shaft of the motor 73 and a sprocket 75 fixed to one end of the screw-shaft 71. As a result, when the motor 73 is energized to rotate the screw-shaft 71, the server 63 is moved guided by the rails 62 between a winding position A shown in solid lines and a transferring position B shown in phantom lines in FIG. 2.

Immediately below a front end of the server 63 in the winding position A, there is provided a building machine 81 whose rotating axis is in parallel with the rollers 47. The belt-shaped members 2 are supplied from the server 63 onto the building machine 81 about which the members 2 are wound. Immediately below the roller conveyor 54 and the server 63 there are arranged large diameter rolls 82 about which tire constituting members, for example, belt plies have been wound. The tire constituting members are paid out of the rolls 82 to be supplied through the server 83 onto the building machine 81 about which the members are wound.

The operation of the apparatus above described will be explained hereinafter.

It is assumed that the lifter 11 is at the lower limit position, the roller conveyor 54 is awaiting at the rest position shown in solid lines in FIG. 2, and the server 63 is awaiting at the transferring position B.

First, the container 1 including therein belt-shaped member 2 loaded in a preceding process is transferred onto the lifter 11 by means of a low lift so as to be arranged on the lifting base 13. The piston rod 18 of the cylinder 17 of the lifter 11 is then extended to rock the rocking links 15 and 16 so that the lifting base 13 is raised together with the container 1. If the lifter has been positioned at the upper limit position, such a lifting operation is not needed. The lifting base 13 is raised to the upper limit position and the detecting sensor 24 detects the rocking link 16, at which moment the operation of the cylinder 17 is stopped.

Thereafter, when the motor 38 is energized to rotate the screw-shaft 34, the roller conveyor 54 is moved guided by the rails 32 toward the container 1 in the width direction of the belt-shaped members 2. As a result of such movement of the roller conveyor 54, free ends of the elongated rollers 47 are inserted through the slits 7 formed in one side surface of the container 1 into the container 1 and arrive directly below the belt-shaped member 2 on the lowermost shelf and nearest to the roller conveyor 54. The movement of the roller conveyor 54 is stopped when the free ends of the elongated rollers 47 arrive between the belt-shaped member 2 nearest to the roller conveyor 54 and the adjacent next belt-shaped member 2 on the same shelf. In this case, it may be considered to move the lifter 11 and the container 1 toward the stationary roller conveyor 54. However, it is disadvantageous to do so inasmuch as the lifter 11 and the container 1 may interfere with the rolls 82.

The lifter 11 is then actuated to lower the lifting base 13 and the container 1. During such a lowering movement, the belt-shaped member 2 nearest to the roller conveyor and positioned on the lowermost shelf 8 of the container 1 is transferred therefrom onto free ends of the elongated rollers 47 to be taken out from the container 1. The lowering movement of the lifting base 13 is stopped when the cylinder 17 receives a detecting signal from the detecting sensor 23 on detecting the uppermost slit 22. The distance lowered of the lifting base 13 and the container 1 is equal to the distance between the vertically adjacent belt-shaped members 2.

In this case, the belt-shaped member 2 transferred from the container 1 onto the roller conveyor 54 is aligned with the server 63 in the transferring position B in this stage, so that it is not needed to move the roller conveyor 54. However, in the case that the second, third and fourth belt-shaped members more remote from the roller conveyor are taken out, it is necessary to move the roller conveyor 54 together with the belt-shaped member in its width direction to bring the belt-shaped member 2 into alignment with the server 63 because the belt-shaped member 2 immediately after taken out from the container onto the roller conveyor 54 is shifted from the server 63 at the transferring position B in the width direction of the member 2.

The motor 48 is then energized to rotate all the rollers 47 in the same direction at the same speed. As a result, the belt-shaped member 2 arranged on the rollers 47 is moved in the longitudinal direction to the server 63, during which movement the belt-shaped member 2 is subjected to centering operation of the centering mechanism 67 so as to be centered. On the other hand, during the steps of taking-out and transferring movement of the belt-shaped member 2, tire constituting members are supplied from the rolls 82 to the building machine 81 and wound about a drum of the building machine 81. Thereafter, the server 63 is moved, guided by the rails 62 from the transferring position B to the winding position A, by the rotation of the screw-shaft 71 driven by the motor 73.

After the front end of the server 63 has been rocked downwardly by the operation of the cylinder 68, the belt-shaped member 2 on the server 63 is supplied onto the building machine 81 and wound about the tire constituting members on the building machine 81. The annular band thus constructed is removed from the building machine 81 and then transferred to a next step. On the other hand, the empty server 63 is returned to its initial position with the front end being rocked, and thereafter moved from the winding position A to the transferring position B by energizing the motor 73.

The lifter 11 is then actuated to lower the container 1 through a distance equal to the distance between the vertically adjacent belt-shaped members 2 in the same manner as above described, the belt-shaped member 2 nearest to the roller conveyor 54 on the second shelf immediately above the lowermost shelf is taken out from the container onto the rollers 47. After the rollers 47 are then rotated to transfer the belt-shaped member 2 onto the server 63, the server 63 is moved into the winding position A where the belt-shaped member 2 is supplied onto the building machine 81 and then the empty server 63 is returned to the transferring position B. This operation is repeated to take out the belt-shaped members 2 nearest to the roller conveyor 54 on the respective shelves one by one from the lowermost to the uppermost shelf and to transfer these members 2 to the server 63.

When all the belt-shaped members 2 nearest to the roller conveyor 54 have been taken out from the conveyor 1 and the lifting base 13 has been lowered to the taking-out operation termination position, the detecting sensor 25 detects the rocking link 16 to feed the detecting signal to the cylinder 17. As a result, the cylinder 17 is actuated to raise again the lifting base 13 to the upper limit position.

Thereafter, the roller conveyor 54 is moved toward the container 1. This movement of the roller conveyor 54 is stopped when the free ends of the rollers 47 arrive between second and third belt-shaped members 2 positioned against the already taken out belt shaped member 2 nearest to the roller conveyor 54.

The lifting base 13 and the container 1 are then lowered through one pitch or the distance between the vertically adjacent shelves to take out the second belt-shaped member 2 positioned on the lowermost shelf from the container onto the rollers 47. The belt-shaped member 2 arranged on the rollers 47 at this moment is not aligned with the server 63 in the transferring position B. Therefore, the motor 38 is energized to move the roller conveyor 54 together with the belt-shaped member 2 onto one side to bring the belt-shaped member 2 into alignment with the server 63.

The rollers 47 are then rotated to transfer the belt-shaped member 2 from the rollers 47 onto the server 63. Thereafter, the roller conveyor 54 is again moved to the position where the belt-shaped member 2 in the second position is taken out from the container 1. On the other hand, after the server 63 supporting thereon the belt-shaped member 2 as above described has been moved to the winding position, the belt-shaped member 2 is wound about the building machine 81 and the server is then returned to the transferring position B. This operation is successively repeated to take out the belt-shaped members at second positions one by one in the order of from the lowermost shelf to the uppermost shelf and to transfer these members to the building machine 81.

After completion of the taking-out and transferring of the belt-shaped members 2 at the second positions, the belt-shaped members 2 at the third and fourth positions are successively taken out from the container 1 and transferred to the building machine. All the belt-shaped members 2 in all the shelves of the container 1 are taken out and transferred to the building machine one by one in this manner.

The cylinder 17 is then actuated to lower the lifting base 13 to the lower limit position where the detecting sensor 26 detects the rocking link 16. Thereafter, the empty container 1 is removed from the lifter 11 to transfer by means of a fork lift truck or the like. If the container includes a shelf not having a belt-shaped member 2 arranged thereon, the container is lowered skipping over the empty shelf. Moreover, if the container includes a shelf having belt-shaped members less than a predetermined number, the roller conveyor 54 is moved in the longitudinal direction of the rollers 47 skipping over the absent position.

In this embodiment, the taking out and transferring of the belt-shaped members can be carried out only by means of the simply constructed lifter 11 and roller conveyor 54 so that the apparatus for the purpose according to the invention can be lightweight and inexpensive to manufacture. The taking out and transferring of the belt-shaped members can be effected without relying upon the labor of an operator, thereby improving the operating efficiency and enabling the apparatus to be automated.

In the above embodiment, moreover, the belt-shaped members 2 have been explained taken-out and transferred in the order that the first belt-shaped members nearest to the roller conveyor 54 are taken-out of the order of from the lowermost shelf to the uppermost shelf and the second, third and fourth members in the same manner. In this embodiment, however, the belt-shaped members 2 may be taken out and transferred in the order of the first member to fourth member on the lowermost shelf and thereafter with consecutively upper shelves to the uppermost shelf in the same manner. In the above embodiment, all of the rollers 47 have been given driving power to be rotated. In this invention, however, some rollers 47 may be driven and the remaining rollers may be freely rotated.

As can be seen from the above explanation, according to the invention the operation of taking out the belt shaped members from the container and transferring them to the server one by one can be effected only by the lifter and the roller conveyor, so that whole the apparatus is simple in construction and lightweight and inexpensive to manufacture. Moreover, such operations can be mechanically carried out without relying upon the labor of an operator so that operating efficiency is improved and the operations can be automated.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A belt-shaped member transfer apparatus for taking belt-shaped members one-by-one out of a container and for transferring the belt-shaped members to a server of a tire building machine, said container having a top, a bottom, two sides and two ends, at least one of said ends being open for removal of the belt-shaped members therethrough, said container further having a plurality of vertically arranged shelves, the belt-shaped members being arranged side-by-side and parallel with each other on each of the shelves, said apparatus comprising:
   a lifter for supporting the container thereon and for intermittently raising and lowering the container;
   a roller conveyor including a carriage arranged on one side of the container and movable transversely to the belt-shaped members;
   a plurality of elongated rollers rotatably supported by the carriage and extending transversely to the belt-shaped members, said rollers being spaced from each other in a longitudinal direction of the belt-shaped members; and
   means for rotatably driving the rollers;
   whereby the rollers may enter the container through openings in a side thereof and discharge a belt-shaped member from said container through said open end by rotation of said rollers.

2. A belt-shaped member transfer apparatus as set forth in claim 1, wherein said lifter comprises a stationary base, a lifting base supporting the container thereon and rocking links consisting of two groups, one group of rocking links being pivotally connected with their lower ends to the stationary base and movably connected by their upper ends to the lifting base, and the other group of rocking links being pivotally connected by their upper ends to the lifting base and movably connected by their lower ends to the stationary base, said two groups each having center portions pivotally connected to each other.

3. A belt-shaped member transfer apparatus as set forth in claim 2, wherein at least one cylinder is connected between the stationary base and a mid portion of one of the rocking links.

4. A belt-shaped member transfer apparatus as set forth in claim 2, wherein said lifter comprises container vertical position control means which comprises a slit bar extending in a vertical direction and formed with slits spaced apart from each other by distances substantially equal to distances between the shelves, and a detecting sensor for detecting the slits of the slit bar and for controlling movements of the lifter.

5. A belt-shaped member transfer apparatus as set forth in claim 2, wherein said lifter is provided with rocking link end detecting means for detecting the movable end of at least one rocking link when the lifting base has been raised to an upper limit position, when the lifting base has arrived at a taking-out operation termination position, and when the lifting base has been lowered to a lower limit position.

6. A belt-shaped member transfer apparatus as set forth in claim 1, wherein said carriage is movable toward and away from the container along rails extending transversely to the belt-shaped members arranged in the container.

7. A belt-shaped member transfer apparatus as set forth in claim 1, wherein the carriage comprises a plurality of bearings in two rows in opposition to each other for supporting the bottom ends of the elongated rollers.

* * * * *